United States Patent [19]
Naylor

[11] 3,932,327
[45] Jan. 13, 1976

[54] ADHESIVE COMPOSITIONS

[75] Inventor: Floyd E. Naylor, Bartlesville, Okla.

[73] Assignee: Phillips Petroleum Company, Bartlesville, Okla.

[22] Filed: Feb. 5, 1973

[21] Appl. No.: 329,558

[52] U.S. Cl....... 260/27 BB; 260/33.6 A; 260/876 B
[51] Int. Cl.² ..................... C08K 5/01; C08L 93/04
[58] Field of Search ........ 260/880 B, 27 BB, 876 B, 260/33.6 A

[56] References Cited
UNITED STATES PATENTS

| | | | |
|---|---|---|---|
| 3,149,182 | 9/1964 | Porter | 260/880 B |
| 3,238,173 | 3/1966 | Bailey et al. | 260/880 B |
| 3,239,478 | 3/1966 | Harlan | 260/880 B |
| 3,281,383 | 10/1966 | Zelinski et al. | 260/880 B |
| 3,325,430 | 6/1967 | Grasley | 260/880 B |
| 3,519,585 | 7/1970 | Miller | 260/880 B |
| 3,658,740 | 4/1972 | Marrs et al. | 260/880 B |

*Primary Examiner*—Donald E. Czaja
*Assistant Examiner*—H. H. Fletcher

[57] ABSTRACT

An adhesive composition made from two copolymers of the styrene-butadiene type, one having terminal segments of polystyrene and one having terminal segments of polybutadiene. A tackifying resin is included in the adhesive, together with appropriate solvents.

8 Claims, No Drawings

ADHESIVE COMPOSITIONS

This invention relates to adhesive compositions. More specifically, this invention relates to an adhesive composition comprising a linear or radial block copolymer of a conjugated diene and a vinyl aromatic hydrocarbon having terminal units or segments derived from the polymerization of the vinyl aromatic hydrocarbon, a second copolymer of a conjugated diene and a vinyl aromatic hydrocarbon having terminal blocks or segments derived from the polymerization of the conjugated diene, and a tackifier in an organic solvent which is useful in bonding a variety of like or unlike surfaces together.

Many adhesive and cementing compositions have been suggested in the art for bonding material such as rubber, wood, metal, painted objects, plastic, paper, fabric, and the like, to each other or to other materials. Various types of polymers have been suggested for use in adhesive recipes to accomplish these goals, but the majority of the polymers developed in the prior art have not been completely satisfactory.

An object of this invention is to provide an adhesive composition of superior tack with satisfactory peel strength and creep resistance.

Other aspects, objects and advantages of this invention will be apparent to those skilled in the art upon careful study of the following specification, examples, and appended claims.

I have now discovered that an adhesive composition having superior tack with satisfactory peel strength and creep resistance which is useful for and capable of satisfactorily bonding a variety of films to a variety of substrates can be prepared by blending a first copolymer, a second copolymer, a tackifier and an organic solvent.

The first component block copolymer of the adhesive composition of this invention is one selected from the group consisting of linear block copolymers and radial block copolymers, having terminal segments comprising essentially polymer made from a vinyl-substituted aromatic hydrocarbon. As used herein, the term "linear" block copolymer is intended to mean copolymers having the general configuration:

wherein each A group is a terminal block segment comprising a polymer made from a vinyl-substituted aromatic hydrocarbon and B is a block segment comprising a polymer made from a conjugated diene.

Further, as used herein, the term "radial" or "branched" block copolymer is intended to mean copolymers having the general configuration:

wherein each A group is a terminal block segment comprising a polymer made from a vinyl-substituted aromatic hydrocarbon and each B is a block segment comprising a polymer made from a conjugated diene, Z is derived from a polyfunctional compound having at least three reactive sites, and n is not less than 3. The radial block copolymer, as herein defined, must have at least three block copolymer branches radiating from a nucleus, Z.

The relative amounts of the vinyl-substituted aromatic hydrocarbon compound and the conjugated diene used in producing the block copolymers described can vary over a wide range. The amount of conjugated diene present in the block copolymer can be present in the range of from about 60 parts by weight per 100 parts by weight of the block copolymer to about 80 parts by weight. The vinyl-substituted aromatic compounds can be present in the range of about 20 to about 40 parts by weight per 100 parts by weight of the block copolymer. The amount of vinyl-substituted aromatic hydrocarbon that is present as terminal block segments of the copolymer used in this invention can vary over a wide range. It is desirable that the terminal block segments comprise the vinyl-substituted aromatic hydrocarbon to the extent of at least 20 percent by weight of the linear or radial block copolymer.

The vinyl-substituted aromatic compound can be polymerized for a period of time to produce a polymer block segment of the vinyl-substituted aromatic compound of sufficient size followed by a second polymerization step wherein the conjugated diene is polymerized. In some instances, it may be desirable to allow all of the vinyl-substituted aromatic compound to be polymerized before adding the conjugated diene for the second polymerization step. In other instances, any unreacted vinyl-substituted aromatic compound can be removed from the polymerization mixture followed by the addition of the conjugated diene for the second polymerization step. And in still other instances, any unreacted vinyl-substituted aromatic compound may be left in the polymerization system and the conjugated diene can be added for the second polymerization step. In the latter instance, the polymer block segments formed in the second polymerization step may contain both conjugated diene monomer units and vinyl-substituted aromatic monomer units.

It is preferable that the terminal polymer block segments on the branched block copolymer be homopolymer blocks of the vinyl-substituted aromatic compound. However, it is also within the scope of this invention to utilize branched block copolymers with terminal polymer block segments that are predominantly vinyl-substituted aromatic polymers with minor amounts of the conjugated diene monomer units.

The polymers which are represented by the above copolymers of this invention are recognized in the art as having the tensile characteristics of vulcanized elastomers although said polymers are in an uncured or unvulcanized condition. These polymers are further described in terms of their inherent viscosity. According to this invention these polymers have inherent viscosity of from 0.75 up to 1.5.

Monomers suitable for the preparation of the aforementioned block polymers include conjugated dienes having from 4 to 12 carbon atoms per molecule and vinyl aromatic hydrocarbons having from 8 to 24 carbon atoms per molecule. Suitable examples of the above monomers include 1,3-butadiene, 1,3-pentadiene, 1,3-octadiene, 1,3-dodecadiene, isoprene, 2,3-dimethyl-1,3-butadiene and the like. Suitable examples of vinyl aromatic hydrocarbon monomers include styrene, 4-methylstyrene, 4-tert-butylstyrene, 3,5-diethylstyrene, 3,5-di-n-butylstyrene, and the like. Preferred monomers include 1,3-butadiene, styrene, 4-tert-butylstyrene and 1,3-pentadiene.

The above referred to "Z" group which forms the nucleus from which the polymer blocks of the radial block copolymer radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides and the like. As will be hereinafter described the polymer block segments are polymerized in the presence of an organolithium initiator. It is preferred that the amount of polyfunctional compound utilized be 1.0 equivalent per equivalent of carbon-lithium in the polymer for maximum branching. Reference to U.S. Pat. No. 3,281,383, R. P. Zelinski and H. L. Hsieh, issued Oct. 25, 1966, will reveal further details of the polyfunctional compounds useful in the formation of the radial block copolymers.

The second component block copolymer of this invention is one selected from the group consisting of linear block copolymers and radical block copolymers, having terminal segments comprising essentially polymer made from a conjugated diene. The second component linear block copolymers have the general configuration:

B—A—B wherein each B group is a terminal block segment comprising a polymer made from a conjugated diene and A is a block segment comprising a polymer made from a vinyl-substituted aromatic hydrocarbon.

The second component radial block copolymers have the general configuration:

$Z(-AB)_n$ wherein B 13 a terminal block segment comprising a polymer made from a conjugated diene, A is a block segment comprising a polymer made from a vinyl-substituted aromatic hydrocarbon, Z is derived from a polyfunctional compound having at least three reactive sites, and n is not less than 3. The radial block copolymer, as herein defined, must have at least the three block copolymer branches radiating from a nucleus, Z.

The second copolymer is further characterized in that the amount of vinyl aromatic hydrocarbon present in the block copolymer is in the range of from about 10 to about 70 parts by weight per 100 parts by weight of the block copolymer. The second copolymers are characterized as having an inherent viscosity of from 0.75 to 2.5, with a preferred range of from 1.0 to 1.5.

In contrast to the first copolymer, the second copolymers exhibit tensile properties of uncured rubbery polymers. For example, they do not possess high green strength which is characteristic of the block copolymers of the first type.

Monomers suitable for the preparation of the second component block copolymers include the same monomers as those described as being suitable for the preparation of the first component block copolymers.

The linear block copolymers of this invention can be prepared by any of the conventional techniques known in the art, such as those described in U.S Pat. No. 3,251,905, R. P. Zelinski, issued May 17, 1966, or in U.S. Pat. No. 3,287,333, R. P. Zelinski, issued Nov. 22, 1966.

The radial block copolymers of this invention can be prepared by any of the conventional techniques known in the art, such as those described in U.S. Pat. No. 3,281,383, mentioned previously as in U.S. Pat. No. 3,692,874, R. C. Farrar and C. F. Wofford, issued Sept. 19, 1972. Briefly, the method of forming the radial block copolymers is as follows. The monomer selected to be the terminal block segment is polymerized first in the presence of an organometallic initiator. After the first monomer has been polymerized to form the initial polymer block, the second monomer can then be added to the polymerization mixture to produce a block polymer of the two monomers having a terminal metallic atom. The metal-terminated polymer can then be conveniently reacted with a polyfunctional compound having at least three reactive sites capable of reacting with the carbon-metal bond of the polymer.

Generally, the optimum amount of polyfunctional compound is an amount constituting one equivalent based upon the metal present in the polymer. In other words, each reactive site on the polyfunctional compound will react with a carbon-metal bond in the polymer. Larger amounts of the polyfunctional compound encourage the production of polymers that are coupled in a linear configuration instead of being branched. When equivalent amounts of the polyfunctional compound and the metal-terminated polymer are reacted, the final product comprises a radial polymer in which the component polymer chains project from a nucleus formed from the polyfunctional compound.

The tackifier which is useful in this invention can be any of the substances known in the art for enhancing the tack of adhesive compositions. Examples of some suitable tackifiers include rosin, dehydrogenated rosin, rosin plus polyterpene resins, hydrogenated rosin esters of glycerol, hydrogenated rosin esters of pentaerythritol, coumarone-indene resins, hydrogenated rosin, esters of polymerized rosin and glycerol, maleic anhydride modified rosin and rosin derivatives, partial esters of styrenemaleic acid copolymers, chlorinated biphenyls, oil-soluble phenol aldehyde resins, and the like.

The adhesive composition of this invention should be dissolved or dispersed in an organic solvent prior to application to a surface. The solvent reduces the viscosity of the adhesive composition and serves to wet the surfaces of the materials to be bonded together. Although any organic solvent which is inert toward the other components of the mixture can be used, the preferred solvents are saturated aliphatic, cycloaliphatic, and aromatic hydrocarbons, and mixtures thereof, e.g., pentane, 2-methylpentane, hexane, 3-ethylhexane, heptane, octane, nonane, naphtha, cyclopentane, methylcyclopentane, cyclohexane, methylcyclohexane, benzene, toluene, xylene and the like. Other liquid organic solvents can be used, e.g., halogenated hydrocarbons, ethers, ketones, esters, and the like. Mixtures of any of the foregoing solvents can be used with the adhesive compositions of this invention. Although the amount of solvent is not especially critical, the solvent generally will be used in an amount such as to provide a solution or dispersion containing about 40–90, preferably 60–85, weight percent solvent, with the remainder of the solution or dispersion comprising the first copolymer, the second copolymer, tackifier, and other substances which optionally can be present, e.g., pigments, wetting agents, antioxidants, curatives, reinforcing agents, fillers, and the like.

The weight ratio of the first copolymer to the second copolymer is generally within the range of about 20:1 to about 1.5:1, preferably being within the range of about 20:1 to about 3:1.

The weight ratio of the combined weights of the first and second copolymers to the weight of the tackifier is within the range of about 0.1:1 to about 10:1, preferably being within the range of about 0.5:1 to about 2:1.

When the various components of the adhesive combination of this invention are blended together, the order of mixing is not critical; one can measure each component into an apparatus suitable for blending in any order accompanied by mixing, or mixing can be deferred until all of the components have been introduced into the blending apparatus. Mixing can proceed by any method known in the art for mixing viscous material. Mixing should continue until the solution viscosity assumes a constant value.

The polymer blends of this invention which comprise the block copolymers described above find their particular utility in the area of adhesive formulations, caulking compounds, sealants, mastics, and the like. In particular, the polymer blends of this invention are especially suited to the preparation of pressure-sensitive adhesive formulations, i.e., compositions comprising the above blend of block copolymers, solvent, tackifier, antioxidant, and the like. They can also be employed in contact adhesive formulations and hot melt adhesive formulations. As indicated above, a blend of this invention can be employed in the presence of conventional fillers, tackifiers, antioxidants, pigments, stabilizers, and diluents, to form the above-mentioned adhesive formulations.

The following examples illustrate the use of the present invention.

The block copolymers utilized in preparing the adhesive formulations of this invention are given in the following table.

TABLE I

| Designation | Polymer Type Schedule Description |
|---|---|
| K | Branched block copolymer of 1,3-butadiene and styrene prepared according to recipe for copolymer "K", having terminal block segments of block polystyrene. |
| L | Linear block copolymer of 1,3-butadiene and styrene prepared according to recipe for copolymer "L", having terminal block segments of block polybutadiene. |
| M | Radial block copolymer of 1,3-butadiene and styrene commercially available as "Solprene* 411", a commercial radial 70:30 (by weight) 1,3-butadiene:styrene block copolymer, having terminal block segments of block polystyrene. |
| N | Linear block copolymer of 1,3-butadiene and styrene prepared according to recipe for copolymer "N" having terminal block segments of block polybutadiene. |

It will be noted that the polymer types employed include branched block copolymers, linear block copolymers and radial block copolymers. Copolymer M is not included under the K designation because it was not prepared according to exactly the same recipe as was the K copolymer; however, copolymers K and M, both being of the same type, were similarly prepared.

Copolymer "K" was prepared for use in adhesive formulations in accordance with the following recipe:

Recipe for Copolymer "K"

| | Parts by weight, or (mhm) |
|---|---|
| Cyclohexane | 780 |
| Styrene | 30 |
| 1,3-Butadiene | 70 |
| n-Butyllithium, mhm | (2.2) |
| Tetrahydrofuran | 0.05 |
| Epoxol 9-5(a) | 0.4 |
| (a)an epoxidized linseed oil which can be described as glycerol, 1-(9,10:12,13:15,16-triepoxyoctadecanoate)-2-(9,10:12,13-diepoxyoctadecanoate)-3-(9,10-epoxyoctadecanoate). | |

*Trademark, Phillips Petroleum Co.

Polymerization was initiated at 70° C. with styrene, n-butyllithium and tetrahydrofuran present in the cyclohexane diluent. Polymerization was continued for about 30 minutes. 1,3-Butadiene was then added and polymerization was continued for an additional 30 minutes. Epoxol 9–5 was then added and polymerization continued for an additional 30 minutes. At the conclusion of the polymerization, the reaction mixture was charged with an antioxidant, N-phenyl-2-naphthylamine, and a terminating agent, isopropyl alcohol. The solvent was removed, leaving the polymer as product.

Block copolymer "L" was prepared in accordance with the following recipe:

Recipe for Copolymer "L"

| | Parts by weight, or (mhm) |
|---|---|
| Cyclohexane | 780 |
| 1,3-Butadiene | 70 |
| sec-Butyllithium, mhm | (1.0) |
| Styrene | 30 |

Polymerization was initiated at 70° C. with sec-butyllithium and one half the indicated amount of 1,3-butadiene present in the cyclohexane diluent. Polymerization was continued for 45 minutes. Styrene was then added and polymerization continued for an additional 30 minutes. The remainder of the 1,3-butadiene was then added and polymerization resumed for 45 minutes. At the conclusion of the polymerization the reaction mixture was charged with the antioxidant solution described above and the polymer recovered as described above for copolymer "K".

Block copolymer "N" was prepared in accordance with the following recipe:

Recipe for Copolymer "N"

| | Parts by weight, or (mhm) |
|---|---|
| Cyclohexane | 860 |
| 1,3-Butadiene | 70 |
| sec-Butyllithium, mhm | (1.1) |
| Styrene | 30 |

Polymerization and recovery of copolymer "N" was substantially the same as for copolymer "L".

Copolymer "M" was Solprene* 411, a commercial radial block copolymer of 1,3-butadiene and styrene containing 30.3 percent by weight total styrene and 29.8 percent by weight block polystyrene, and having a Mooney viscosity (MS-4 at 280° F.) of 87, inherent viscosity of 1.51 and an approximate molecular weight of 300,000.

*Trademark, Phillips Petroleum Co.

Adhesive formulations utilizing the polymers listed in Table I were prepared according to the schedule given in Table II. These formulations were tested as shown in Table III.

TABLE II

Formulation of Adhesive Compositions

| Formulation No. | Polymer Combination Parts by Weight Polymer[a] | Polymer Combination Parts by Weight Polymer[a] | Polymer Ratio | Tackifier[b] Parts by Weight | Anti-[a] oxidant Parts by Weight | Solvent Parts by Weight Naphtha[c] | Solvent Parts by Weight Toluene | AFV[d], cPs at 24°C. |
|---|---|---|---|---|---|---|---|---|
| 1 | 100 K | — | — | 100 | 1 | 419 | 47 | (e) |
| 2 | — | 100 L | — | 100 | 1 | 419 | 47 | (e) |
| 3 | 90 K | 10 L | 9:1 | 100 | 1 | 419 | 47 | 1310 |
| 4 | 100 M | — | — | 100 | 1 | 373 | 93 | 2260 |
| 5 | 90 M | 10 N | 9:1 | 100 | 1 | 373 | 93 | 2540 |
| 6 | 80 M | 20 N | 4:1 | 100 | 1 | 373 | 93 | 2600 |
| 7 | 70 M | 30 N | 7:3 | 100 | 1 | 373 | 93 | 2860 |
| 8 | 50 M | 50 N | 1:1 | 100 | 1 | 373 | 93 | 3420 |
| 9 | — | 100 N | — | 100 | 1 | 373 | 93 | 4800 |

[a]Octadecyl ester of 3(3,5-di-tert-butyl-4-hydroxy)phenylpropionic acid.
[b]Hydrogenated rosin ester of pentaerythritol.
[c]ASTM Precipitation Grade, b.p. 135–225° F.
[d]Adhesive Formulation Viscosity. Brookkfield viscosity at 24" C. determined in 4-oz. bottles with No. 4 spindle at 20–50 RPM.
[e]Polymer would not dissolve in the formulation solvent. The amount of toluene was doubled to provide a solution for testing.

TABLE III

Adhesive Properties

| Formulation | Tack.[a] g. | Creep Resistance[b] Hr. to creep 1/16 inch at 90° C. |
|---|---|---|
| 1 | 620 | 0.8 |
| 2 | 620 | 0.1 |
| 3 | 900 | 1.2 |
| 4 | 757 | 26 |
| 5 | 787 | 27 |
| 6 | 807 | 13 |
| 7 | 880 | 12 |
| 8 | 813 | 8 |
| 9 | 533 | 0.1 |

[a]Determined with the polyken Probe Tack Tester according to procedures given in J. Appl. Polymer Sci., 14, p. 2039 (1970).
[b]Creep resistance is based on the time required at 90° C. for 1/16-inch slippage of the bond formed by 1 square inch overlap of an adhesive-coated Mylar film on a steel substrate, the shearing stress being applied by a 2-pound weight hung from the vertical 1-inch wide strip of Mylar film. attached at an angle of 178 degrees relative to the substrate.

The above data indicate that the polymer blends of this invention produce adhesive compositions with outstanding tack and cohesive strength.

It will be evident to those skilled in the art that various modifications of this invention can be made, or followed, in the light of the foregoing disclosure and discussion, without departing from the spirit or scope thereof.

I claim:

1. An adhesive composition comprising:
   a. A block copolymer selected from the group consisting of a linear block copolymer represented by the general formula:
   A—B—A
   and a radial block copolymer represented by the general formula:
   $Z(-BA)_m$
   wherein A is a terminal block segment consisting essentially of polymer formed from monovinyl-substituted aromatic hydrocarbon units which comprise 20 to 40 weight percent of said block copolymer, B is a block segment consisting essentially of polymer formed from conjugated diene hydrocarbon units which comprise 60 to 80 weight percent of said block copolymer, Z is derived from a polyfunctional compound having at least three reactive sites, and m is an integer having a value of not less than 3;
   b. a block copolymer selected from the group consisting of a linear block copolymer represented by the general formula:
   B—A—B
   and a radial block copolymer represented by the general formula:
   $Z(-AB)_n$
   wherein B is a terminal block segment consisting essentially of polymer formed from conjugated diene hydrocarbon units which comprise 30 to 90 weight percent of said block copolymer, A is a block segment consisting essentially of polymer formed from monovinyl-substituted aromatic hydrocarbon units which comprise 10 to 70 weight percent of said block copolymer, Z is derived from a polyfunctional compound having at least three reactive sites, and n is an integer having a value of not less than 3;
   c. a resinous tackifier; and,
   d. an organic solvent which is inert toward each of said (a), (b) and (c); wherein the weight ratio of said first block copolymer (a) to said second block copolymer (b) is in the approximate range of 20:1 to 1.5:1 and wherein the weight ratio of the combination of said (a) and (b) to said tackifier (c) is in the approximate range of 0.05:1 to 20:1.

2. The adhesive composition of claim 1 wherein each of said block segments of each of said block copolymers (a) and (b) is made from at least one monomer selected from the group consisting of conjugated dienes having from 4 to 12 carbon atoms per molecule and monovinyl-substituted aromatic hydrocarbons having from 8 to 24 carbon atoms per molecule.

3. The adhesive composition of claim 2 wherein said organic solvent is selected from saturated aliphatic, saturated cycloaliphatic, and aromatic hydrocarbons and further wherein the concentration of said solvent in said adhesive composition is in the range of about 40 to about 90 percent by weight.

4. The adhesive composition of claim 3 wherein said block copolymer (a) is a linear block copolymer and said block copolymer (b) is a linear block copolymer.

5. The adhesive composition of claim 3 wherein said block copolymer (a) is a linear block copolymer and said block copolymer (b) is a radial block copolymer.

6. The adhesive composition of claim 3 wherein said block copolymer (a) is a radial block copolymer and said block copolymer (b) is a linear block copolymer.

7. The adhesive composition of claim 3 wherein said block copolymer (a) is a radial block copolymer and said block copolymer (b) is a radial block copolymer.

8. The adhesive composition of claim 5 wherein said block copolymer (a) is formed from 1,3-butadiene and styrene having an approximate butadiene:sytyrene ratio of 70:30 by weight and wherein said block copolymer (b) is formed from 1,3-butadiene and styrene having an approximate butadiene:styrene ratio of 70:30 by weight, said tackifier is a hydrogenated rosin ester of pentaerythritol and said solvent is naphtha.

* * * * *